Aug. 29, 1939.  W. R. WRIGHT, JR  2,171,155
METHOD OF MAKING ASBESTOS-CEMENT SHINGLES
Filed April 12, 1937  2 Sheets-Sheet 1
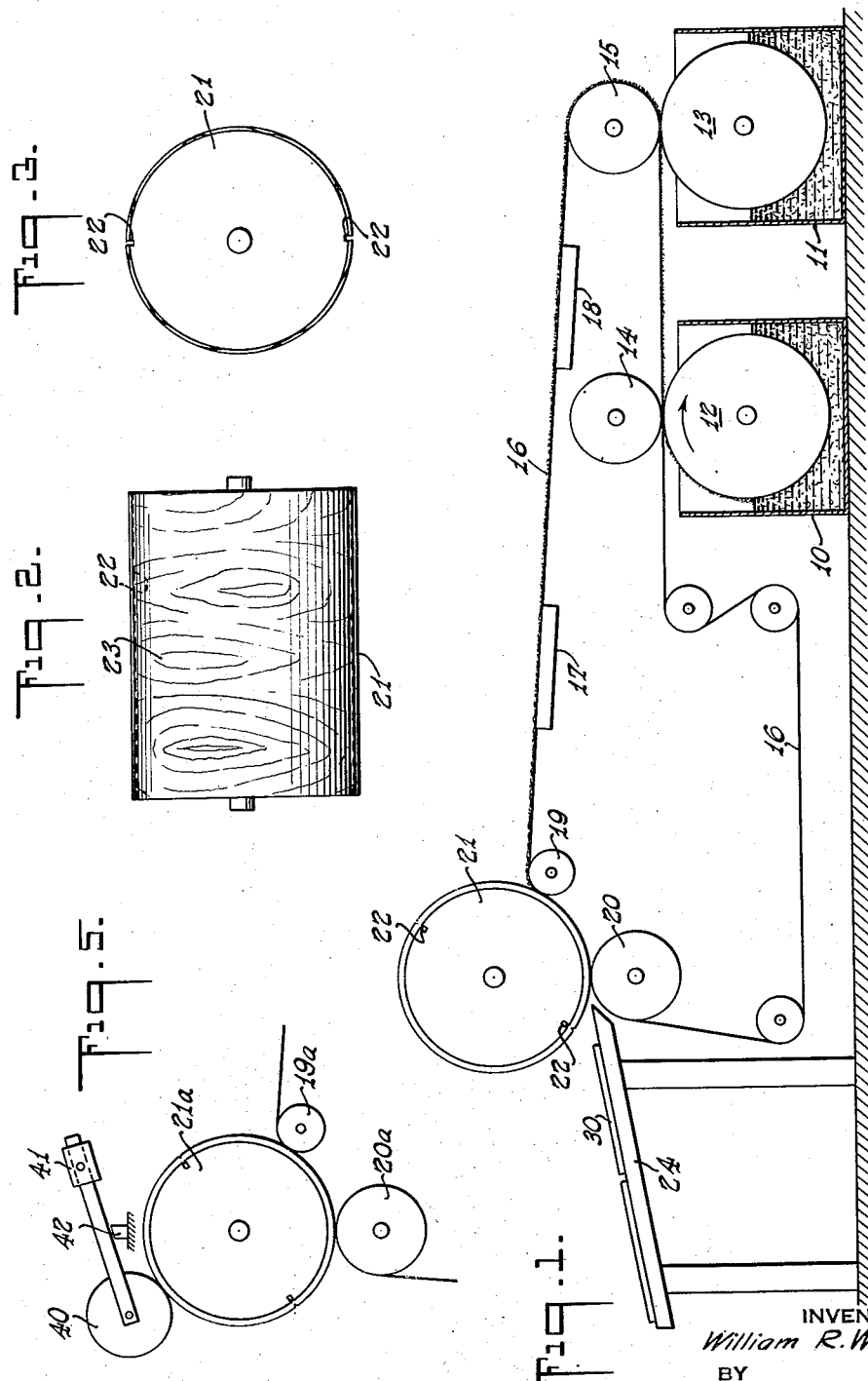
INVENTOR
William R. Wright Jr.
BY
Samuel Stearman
ATTORNEY Aug. 29, 1939.  W. R. WRIGHT, JR  2,171,155
METHOD OF MAKING ASBESTOS-CEMENT SHINGLES
Filed April 12, 1937  2 Sheets-Sheet 2
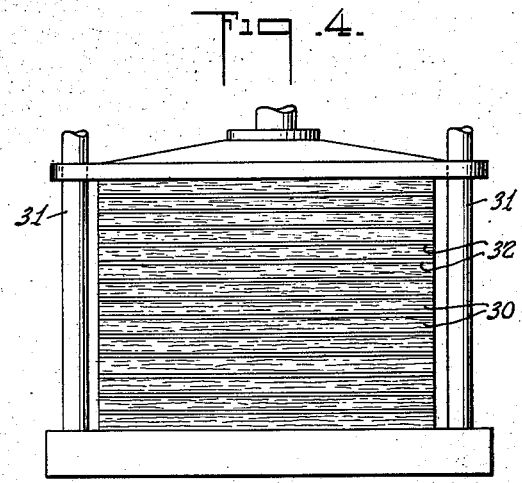
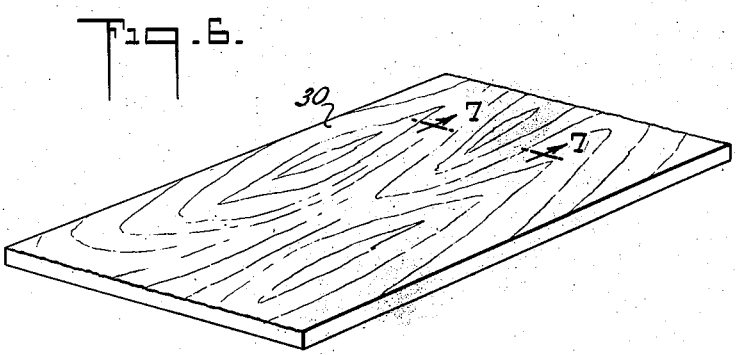
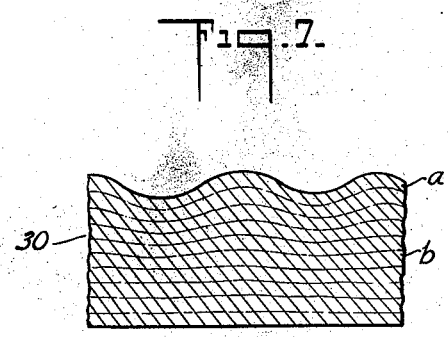
INVENTOR
William R. Wright, Jr.
BY
Samuel Stearman
ATTORNEY Patented Aug. 29, 1939

2,171,155

UNITED STATES PATENT OFFICE 2,171,155

METHOD OF MAKING ASBESTOS-CEMENT SHINGLES

William R. Wright, Jr., Wharton, N. J., assignor to The Patent and Licensing Corporation, New York, N. Y., a corporation of Massachusetts Application April 12, 1937, Serial No. 136,302

1 Claim. (Cl. 92—66)

This invention relates to the manufacture of fiber-cement products and, more particularly, to the production of shingles for covering roofs and side walls, having their upper surfaces irregularly grooved to provide ornamental surface contours, e. g., to provide a simulation of the grained appearance of wooden shingles. The invention is particularly concerned with the production of shingles of the above described type in which asbestos is employed as the fibrous constituent.

Fiber-cement products, such as asbestos-cement shingles and similar roofing elements, are formed, according to common practice, by depositing a film from a wet mixture or furnish of a cementitious material such as Portland cement or the like and fiber onto the endless belt or felt blanket of a wet machine. A rotatable accumulator drum, which is so mounted that its surface is in substantial contact with the belt, picks up the film of cement-fiber mixture from the blanket, the drum making the necessary number of revolutions to build up a sheet of the fiber-cement material thereon to any desired thickness. The sheet is then split and removed from the accumulator drum and cut into elements of a suitable size which are stacked in piles with a metal plate interposed between adjacent elements. The stacked elements are subjected to compression in a hydraulic press or the like to compact the same, the compacted elements, after removal from the press, being then permitted to stand until the cement has become hardened.

Heretofore it has been proposed to provide ornamental surface contours on fiber-cement shingles or similar elements, by embossing one surface of the sheet, or of the elements into which the sheet is divided, after the sheet has been removed from the accumulator drum.

According to one prior method, the elements are stacked in the hydraulic press with plates carrying an embossing surface interposed between adjacent elements. The fiber-cement elements are in a sufficiently malleable state to receive a surface embossment in conformity with the surface contours of the plates under the heavy pressures exerted by the hydraulic press. This method, though satisfactory in many ways, is costly due to the relatively expensive embossing plates required, particularly in view of the substantial amount of breakage of the plates which has been found to occur. Furthermore, the heavy pressures to which the sheets must be subjected to obtain the embossed effect, leaves the same in a highly compacted state.

According to another proposed method of embossing fiber-cement sheets after the removal of the same from the accumulator drum, the sheets are passed between the opposed surfaces of embossing rolls. The pressure necessarily exerted by the rolls on the sheets to obtain the embossed effect eliminates the need of any further pressing operation. However, the pressure exerted on the sheets in this manner tends to cause a flowing of the material of the sheets and a consequent distortion of the sheets. It furthermore heavily compacts the sheets and causes fine cracks to appear, particularly at the raised portions.

The principal object of the present invention is to provide ornamental or other surface contours on products, particularly fiber-cement shingles and the like, in the course of their production on a wet machine. This object is attained, according to the present invention, by providing the surface of the accumulator drum of the wet machine with contours complemental to those desired in the surface of the finished product. The product will be molded in conformity with the contours of the drum as it is built-up therein. The built-up product may be pressed either during or after removal of the same from the accumulator drum. The pressure may be regulated in either case to produce a finished product of the desired density, the necessity of heavy embossing pressures as required by the prior processes being eliminated.

The invention will be more fully understood and further objects and advantages thereof will appear from the detailed description which is to follow and from the accompanying drawings in which, Figure 1 is a diagrammatic view in side elevation of an apparatus for the carrying out of the method of the present invention;

Figure 2 is a front elevational view of the accumulator roll employed in the apparatus of Figure 1;

Figure 3 is an end elevation of the accumulator roll of Figure 2;

Figure 4 is a diagrammatic view in elevation of a press which may be employed in the method of the present invention and depicting a stack of shingles positioned in the press;

Figure 5 is a diagrammatic detail view in side elevation of an apparatus employed in a modified form of the present invention.

Figure 6 is a perspective view of a shingle formed by the method of the present invention; and Figure 7 is a diagrammatic sectional view, on a greatly enlarged scale, taken on the line 7—7 of Figure 6.

In the production of fiber-cement shingles according to the method of the present invention, a wet machine of generally conventional form is employed. A machine of this type is depicted diagrammatically in Figure 1 and comprises vats 10 and 11 containing a slurry of a suitable fiber-cement mixture. Two of the vats are shown but it will be understood that a single vat or any suitable number of such vats may be employed. Mounted to rotate within the vats are cylinder molds or pick-up rolls 12 and 13 respectively and above these rolls are mounted couch rolls 14 and 15 respectively. An endless belt or blanket 16 passes between the pick-up rolls 12 and 13 and associated couch rolls 14 and 15, over suction boxes 17 and 18, connected to any suitable air exhausting means, and around rolls 19 and 20 which are mounted in such positions as to maintain the portion of the blanket extending therebetween in substantial contact with the surface of the drum 21. The blanket passes from the roll 20 to suitable return rolls and once again to the pick-up rolls 12 and 13 and couch rolls 14 and 15.

In the operation of the conventional device thus far described, a film of the fiber-cement slurry is picked up by the roll 12 from the vat 10 and deposited on the undersurface of the blanket 16. The roll 13 similarly picks up a film of the slurry from its respective vat 11 and deposits the film on the surface of the first deposited film. The blanket then passes over the suction boxes 17 and 18, where a substantial amount of the moisture of the film is removed, and to the rolls 19 and 20, where the film thereon is brought into contact with the surface of the accumulator drum 21. The drum 21 picks up the film from the blanket and the film is wrapped around the drum which makes as many revolutions as is necessary to build up a body of the desired thickness. The operation of the machine is then stopped and the wet sheet of the fiber-cement material, formed on the surface of the accumulator drum, is cut or "speared" along the grooves 22 (see Figures 1-3) and removed from the drum. The cycle of operation is then repeated.

According to the present invention, the accumulator drum 21 is provided with an irregularly contoured surface, as indicated at 23, which is the complement of that desired for the surface of the sheet formed thereon. The thin fiber-cement film, carried by the endless belt or blanket 16, is in a wet and readily deformable state at the time that it is picked up by the drum 21. It follows that the first film picked up by the surface of the drum 21 will readily conform itself to the surface contours of the drum, i. e., it will follow the surface contours of the accumulator drum to such an extent that the outer surface of the film will exhibit substantially the same surface configuration as that of the drum. Due to the plastic characteristics of the film, however, there will be a slight flowing of the fiber-cement composition of the film resulting in a leveling off of the outer surface of the film to some extent. As each additional layer or ply is added to the previously picked up plies, each said ply will exhibit the surface contours of the drum to an increasingly lesser extent due to the flowing tendencies of the fiber-cement mixture comprising the film until, upon sufficient plies being built up, the outer surface of the plied film will be substantially smooth. Additional plies may be accumulated beyond this point to build up a body of the fiber-cement material to the desired thickness. The body of material is then cut or "speared" along the length of the drum at the grooves 22 (see Figures 1-3), the two seets thus formed being removed from the drum and cut into elements 30 of a desired size and shape.

The product produced in this manner by building up the material on an accumulator roll having an embossed surface as described, may be pressed after removal of the same from the accumulator drum or the pressing action may be accomplished as the films are build up or accumulated on the surface of the drum. In either case, the amount of pressure applied may be regulated to provide elements of any desired compactness.

Where the product is to be pressed after removal of the same from the accumulator drum, the elements 30 are placed in stacks with sheets 32 of a compressible material interposed between the faces of adjacent elements. Any material, which under the pressing action will yield sufficiently to support both the high and low places in the surfaces of the fiber-cement elements, e. g., a fibrous felt either unsaturated or saturated with asphalt or the like, may be employed for the sheets 32. The stacks of fiber-cement elements with the interposed compressible sheets are placed between the platens of any conventional type of pressing machine, such as that shown diagrammatically at 31 in Figure 4, and subjected to sufficient pressure to compact the elements to the desired extent. After the removal of the stacks from the press, the elements 30 are separated from the sheets 32 and are permitted to stand until the cement is thoroughly hardened. The use of the sheets of deformable material, such as saturated felt, between adjacent elements permits the pressing of the elements to take place without, however, substantially altering the surface configuration with which the elements have previously been provided.

Alternatively, the pressing may take place as the products are formed. An apparatus for this purpose is depicted diagrammatically in Figure 5 and comprises a press roll 40 mounted adjacent the surface of the accumulator drum 21A. The press roll 40 is so mounted as to permit several layers to be built up on the surface of the accumulator drum before the press roll makes contact therewith. Thereafter, as the plies are built up, the roll rides on the surface of the plies and compacts them. Any suitable mounting of the roll which permits the performance of these functions may be employed; the apparatus illustrated comprising a pivoted mounting 41 for the axis of the roll 40 and a stop 42, preferably made adjustable, which holds the roll 40 from the surface of the drum 21A to permit several plies to be built up before pressing takes place.

A shingle or other roofing element formed according to the method of the present invention is depicted in Figure 6 and a cross-sectional view on a greatly enlarged scale through such shingle is diagrammatically illustrated in Figure 6. As will be observed from an inspection of Figure 7, the several layers or plies of the film of the fiber-cement mixture comprising the shingle, are each of substantially uniform thickness. The upper ply *a* has a configuration which is complemental to the surface of the accumulator drum on which it was wound. The second and subsequent plies are similarly configured but to a gradually lesser extent until a point is reached at which a ply lies substantially flat. The first flat ply is indicated at b but it will be understood that this is for the purpose of illustration only and that the first flat ply may be nearer or further from the outer contoured ply, depending upon the extent of the contours of the accumulator drum, the thickness of the fiber-cement film and the consistency of the fiber-cement mixture of the film at the time it is picked up by the accumulator drum.

The invention has been described as particularly applicable to the production of fiber-cement elements such as asbestos-cement shingles. However, it will be readily understood by those skilled in the art that the invention may be used in the formation of many other products on a wet machine of the type disclosed. Thus, fibrous products employing other binders than cement or employing cementitious or fibrous materials alone may be formed with ornamental or other surface contours by the practice of the present invention. It will also be apparent that the details of the invention as fully described need not be strictly adhered to but that various changes and modifications may readily suggest themselves to those skilled in the art, without departing from the principles of the invention, as defined by the appended claim.

What I claim is:

A method of making shingles or the like from a wet mixture of hydraulic cement and asbestos fiber comprising accumulating a plurality of superposed thin plies of the cement and fiber mixture upon a substantially cylindrical but irregular surface to form a layer wherein the ply adjacent said surface has an irregular contour complemental in form to that of the said surface and the successive ones of said superposed plies exhibit said contour to an increasingly lesser extent with the outermost one of said plies substantially smooth, accumulating a plurality of superposed additional plies over the outermost of said first named plies until a sheet of the desired thickness is built up on said surface, separating the sheet from the surface, subdividing said sheet into elements of suitable size and compacting the elements while still wet between surfaces of compressible deformable material to prevent substantial deformation of said irregular contour during said compacting.

WILLIAM R. WRIGHT, Jr.